(12) United States Patent
Anjuri et al.

(10) Patent No.: US 7,857,597 B2
(45) Date of Patent: Dec. 28, 2010

(54) BOUNDARY LAYER FINS FOR WIND TURBINE BLADE

(75) Inventors: EswaraRao V S J Anjuri, Andhra Pradesh (IN); Stefan Herr, Greenville, SC (US); Tito K. Vemuri, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/473,827

(22) Filed: May 28, 2009

(65) Prior Publication Data

US 2010/0143144 A1 Jun. 10, 2010

(51) Int. Cl.
*F03D 1/06* (2006.01)
(52) U.S. Cl. .............. 416/236 R; 416/228; 416/235
(58) Field of Classification Search ............ 416/228, 416/235, 236 R, 236 A, 237
See application file for complete search history.

(56) References Cited

U.S. PATENT DOCUMENTS

| | | | | |
|---|---|---|---|---|
| 2,010,094 A | * | 8/1935 | Leinweber | 416/236 R |
| 2,110,621 A | * | 3/1938 | Cohen | 416/236 A |
| 2,265,788 A | * | 12/1941 | Wolf, Sr. et al. | 416/236 R |
| 2,272,358 A | * | 2/1942 | Steinhaus | 416/20 R |
| 4,108,573 A | * | 8/1978 | Wagner | 416/236 A |
| 4,128,363 A | * | 12/1978 | Fujikake et al. | 416/236 A |
| 4,265,596 A | * | 5/1981 | Katagiri et al. | 416/236 A |
| 5,151,014 A | * | 9/1992 | Greenwald et al. | 416/237 |
| 5,217,349 A | * | 6/1993 | Succi | 415/119 |
| 5,860,626 A | * | 1/1999 | Moser | 244/200 |
| 2006/0018759 A1 | * | 1/2006 | Moser | 416/223 R |
| 2007/0110585 A1 | | 5/2007 | Bonnet | |

FOREIGN PATENT DOCUMENTS

| EP | 1944505 A1 | 7/2008 |
|---|---|---|
| WO | 2007140771 A1 | 12/2007 |

* cited by examiner

*Primary Examiner*—Igor Kershteyn
(74) *Attorney, Agent, or Firm*—William F. Heinze; Ernest G. Cusick; Frank A. Landgraff

(57) ABSTRACT

A wind turbine blade includes a plurality of boundary layer fins, aligned substantially parallel to a direction of flow over the blade, for reducing boundary layer separation from the blade.

1 Claim, 6 Drawing Sheets

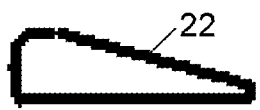
FIG. 7      FIG. 8
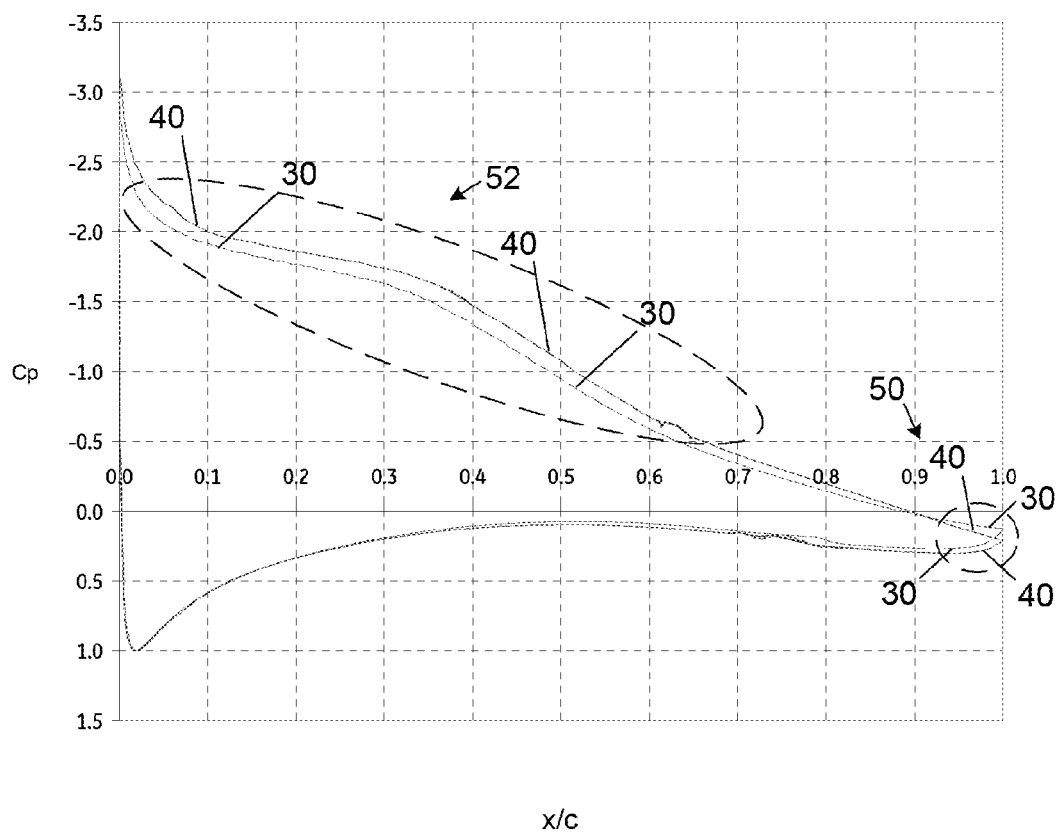
FIG. 9

BOUNDARY LAYER FINS FOR WIND TURBINE BLADE

BACKGROUND OF THE INVENTION

1. Technical Field

The subject matter described here generally relates to wind turbine blades, and, more particularly, to boundary layer fins for a wind turbine blade.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a "spinner" or hub 9 to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that may receive input from an anemometer 18.

The blades 10 generate lift and capture momentum from moving air that is then imparted to the rotor as the blades spin in the "rotor plane." Each blade 10 is typically secured to the hub 9 at its "root" end, and then "spans" radially "outboard" to a free, "tip" end. The front, or "leading edge," of the blade 10 connects the forward-most points of the blade that first contact the air. The rear, or "trailing edge," of the blade 10 is where airflow that has been separated by the leading edge rejoins after passing over the suction and pressure surfaces of the blade. A "chord line" connects the leading and center of trailing edge of the blade. The length of the chord line is simply the "chord." The thickness of a blade 10 varies across the span, and the term "thickness" is typically used to describe the maximum distance between the low pressure suction surface and the high pressure surface on the opposite side of the blade for any particular chord line.

A "boundary layer" is the zone of reduced velocity air that is immediately adjacent to the surface the moving blade 10. The thickness of the boundary layer is typically defined as the distance from the blade at which the flow velocity is 99% of the "freestream" velocity where the air is unaffected by the viscous or friction forces of the blade, but the potential flow is felt beyond the boundary layer. "Flow separation" occurs when the boundary layer travels far enough against an adverse pressure gradient that the flow velocity speed falls almost to zero. The fluid flow then becomes detached from flowing over the blade 10 and instead forms eddies and vortices.

Such boundary layer separation can increase drag on the blade 10, particularly the "pressure drag" which is caused by the pressure differential between the front and rear surfaces of the object as it travels through the fluid. Boundary layer separation may also lead to stall and vortex shedding that can causes noise and structural vibrations in the blade 10. For this reason much effort and research has gone into the design of aerodynamic surfaces which delay flow separation and keep the local flow attached to the blade 10 for as long as possible. For example, International Patent Publication No. WO 2007/140771 and European Patent Application No. EP 1944505 discloses wind turbine blades with vortex generators. However, such vortex generators may reduce the energy that might otherwise be captured from the wind.

BRIEF DESCRIPTION OF THE INVENTION

These and other aspects associated with such conventional approaches are addressed here in by providing, in various embodiments, a wind turbine blade including a plurality of boundary layer fins, aligned substantially parallel to a direction of flow over the blade, for reducing boundary layer separation from the blade.

BRIEF DESCRIPTION OF THE DRAWINGS

Various aspects of this technology will now be described with reference to the following figures ("FIGs.") which are not necessarily drawn to scale, but use the same reference numerals to designate corresponding pails throughout each of the several views.

FIG. 7 is a side view of a boundary layer fin for use with the win turbine blade shown in FIG. 2.

FIG. 8 is a side view of another boundary layer fin for use with the win turbine blade shown in FIG. 2.

FIG. 9 is a plot of pressure coefficient versus blade section non-dimensional chord.

DETAILED DESCRIPTION OF THE INVENTION

Figure 1:
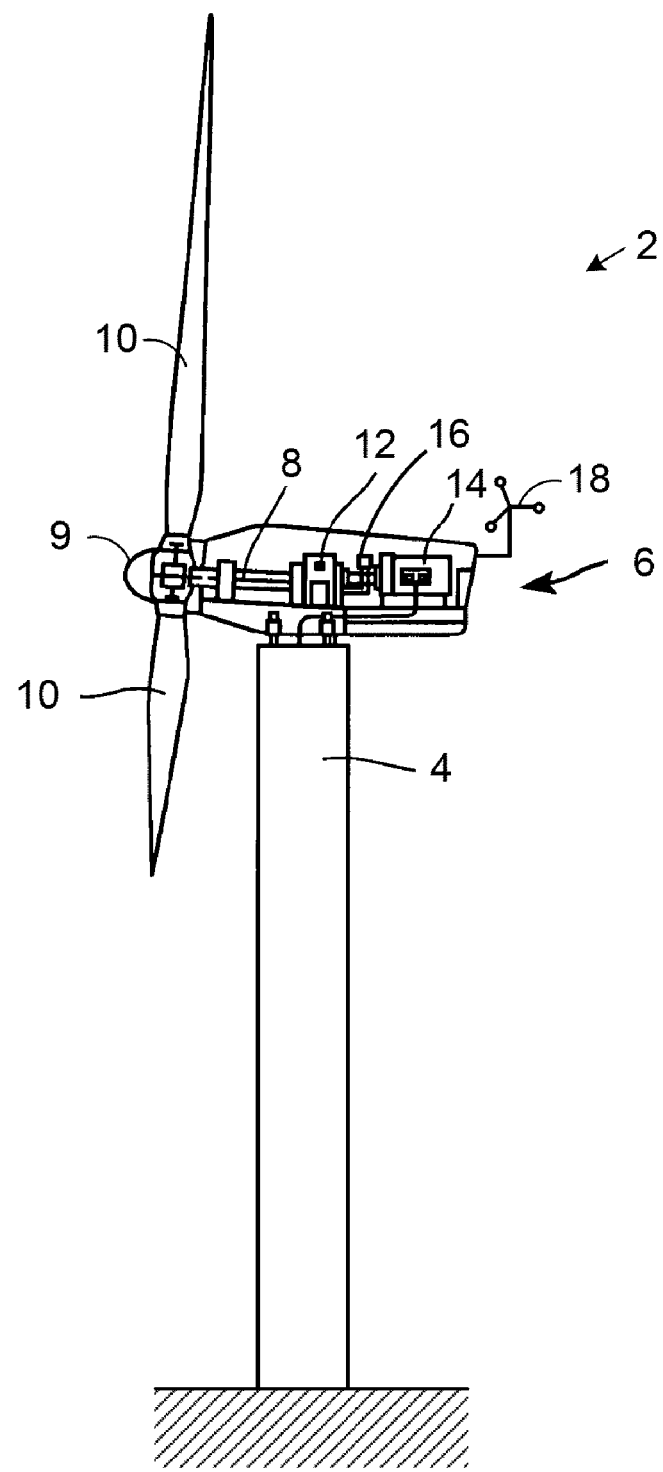
FIG. 1 is a schematic side view of a conventional wind turbine.
Figure 2:
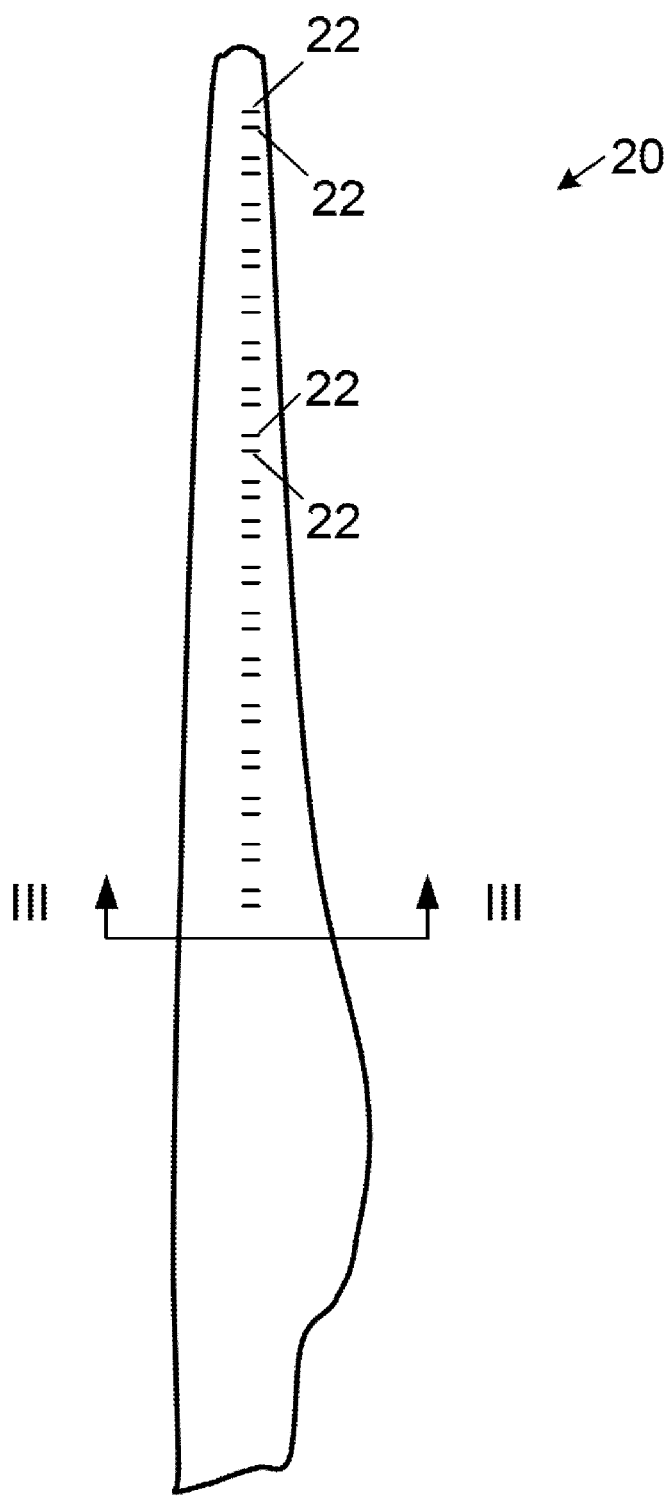
FIG. 2 is a top view of a wind turbine blade.

FIG. 2 is a top view of one embodiment of a wind turbine blade 20, with several boundary layer fins 22, for use with the wind turbine 2 shown in FIG. 1, or any other wind turbine. For example, the blade 20 may replace any of the blades 10, or the blades 10 may be modified to include some or all of the features of the blade 20. Each of the illustrated boundary layer fins 22 extends chordwise, substantially parallel to a direction of flow over the suction side of the blade, for reducing boundary layer separation from the blade. However, some of the boundary layer fins 22 may also be arranged at an angle relative to the flow over the blade and/or on the opposite pressure side of the blade.

Various aspects of the boundary layer fins 22 may be laid out with respect to certain characteristics of the wind turbine blade including the span length of the blade, the corresponding chord on which the boundary layer fin is arranged, and/or the local boundary layer thickness where the boundary layer fin is to be arranged. The local boundary layer thickness is preferably calculated when the blade 20, or corresponding wind turbine 4, is operating without a boundary layer fin 22 and at its "rated rpm," which is typically around fifteen to twenty revolutions per minute with the blade 20 secured at its root end. For a typical blade 20, like the approximately 48.7 meter-long blade available from General Electric Company, the calculated local boundary layer thickness with the blade 20 operating at rated rpm will vary chordwise and spanwise over the blade from about 1 millimeter to about 202 millimeters. At 60% chord from the leading edge of the suction side of such a blade 20, the boundary layer thickness is typically between about 6 millimeters and 52 millimeters. At roughly the same chord position for the outer 33% of the suction side of the span, the boundary layer thickness can range from about 6 millimeters to about 16 millimeters.

The boundary layer fins 22 may be arranged along the entire span of the blade 20, or over only a portion of the span, such as where boundary layer separation is expected to occur. For example, the boundary layer fins 22 may be arranged on the outer 10% to 100% of the span, the outer 25% to 95% of the span, or the outer 50% to 90% of the span of the blade 22. One or more boundary layer fins 22, or pairs of boundary layer fins, may also be provided at discrete locations along the span of the blade 22 where boundary layer separation is problematic or likely to become problematic.

Figure 3:
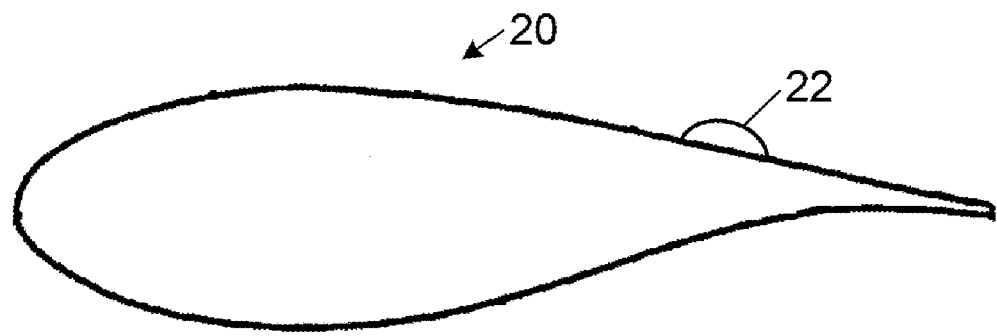
FIG. 3 is a cross-sectional view taken along section line III-III in FIG. 2.

The boundary layer fins 22 illustrated here extend along the chord on which the corresponding boundary layer fin is arranged. As illustrated in FIG. 3, the leading edge of the boundary layer fin 22 may be displaced from the leading and trailing edges of the blade 20. For example, the leading edge of the boundary layer fin 22 may be displaced from the leading edge of the blade 20 between 10% and 95% of the chord, between 15% and 90% of the chord, or between 50% and 90% of the corresponding chord upon which the boundary layer fin is arranged. The leading and/or trailing edges of each of the boundary layer fins 22, or pairs of boundary layer fins 22 are not necessarily aligned with each other and the boundary layer fins 22 may also have different or the same lengths. For example, pairs, and/or other groups, of the boundary layer fins 22 may or may not have substantially the same position relative to the leading and trailing edges of the blade 20.

Figure 4:
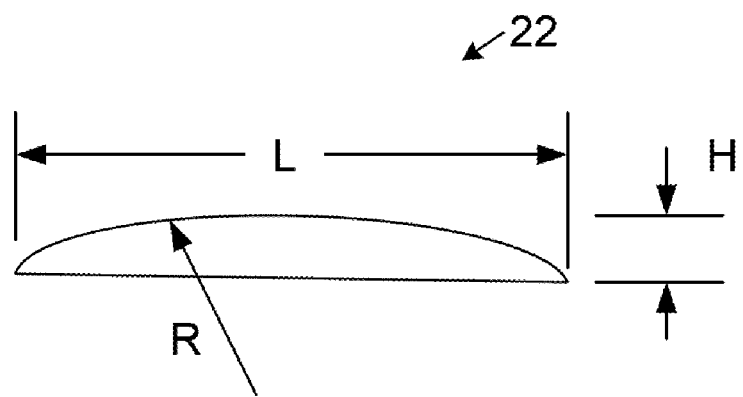
FIG. 4 is an enlarged side view of the boundary layer fin shown in FIG. 3.

Tuning to FIG. 4, the height "H," length "L," and/or radius of curvature "R" of the top surface of the boundary layer fins 22 may vary across the span of the blade 20. For example, the height "H" may be between approximately 25% to 100%, or 50% to 75%, of the local boundary layer thickness at the corresponding boundary layer fin 22. The length "L" may be 2 to 40 times the height "H" or roughly 2 to 10 times the local boundary layer thickness, or about 1 to 4 times the local boundary thickness.

The radius of curvature "R" may be substantially constant or vary over the length "L." In various embodiments, the radius of curvature may be about 2 to 60 times the height "H." or about 2 to 15 times the local boundary layer thickness. For example, the radius of curvature may vary from about 20 millimeters to 300 millimeters, or about 40 millimeters to about 150 millimeters, or about 60 millimeters to 100 millimeters. FIGS. 7 and 8 illustrate various other possible configurations for the top surface of some or all of the boundary layer fins 22.

Figure 5:
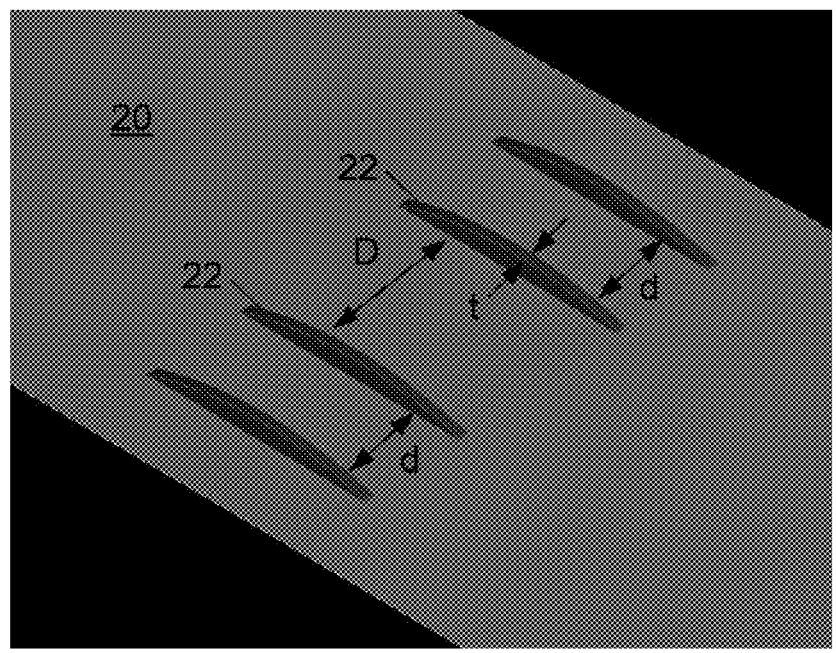
FIG. 5 is an enlarged, partial orthographic view of the surface of the wind turbine blade shown in FIG. 2.
Figure 6:
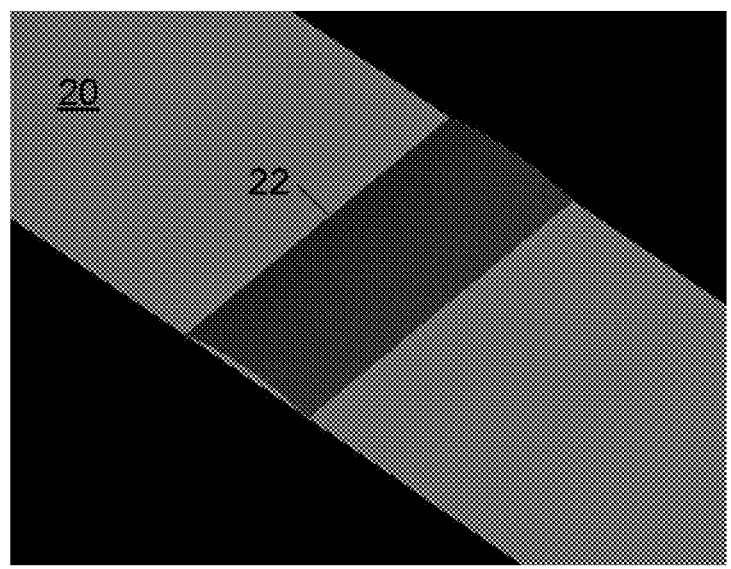
FIG. 6 is an enlarged, partial orthographic view of a boundary layer fin for use with the wind turbine blade shown in FIG. 2.

Turning to FIG. 5 showing two pairs of boundary layer fins 22, the thickness "t" of the boundary layer fins 22 may be approximately 10% to 100%, or 25% to 75%, of the height "H" of the corresponding boundary layer fin 22. Alternatively, as illustrated in FIG. 6, the thickness of some or all of the boundary layer fins 22 may be substantially greater, so that a spanwise bump is forted over some or all of the blade 20. The distance "d" between two boundary layer fins in a pair or larger grouping may be about 2 to 32 times, or 4 to 16 times, the height "H," or about 2 to 8 times a local boundary layer thickness. Similarly, the distance "D" between pairs or other groupings of boundary layer fins may also be about 2 to 32 times, or 4 to 16 times, the height "H." or about 2 to 8 times a local boundary layer thickness. Alternatively, as illustrated in FIG. 6, the distance between individual boundary layer fins 22 and/or groups of boundary layer fins 22 may be substantially zero.

Figure 10:
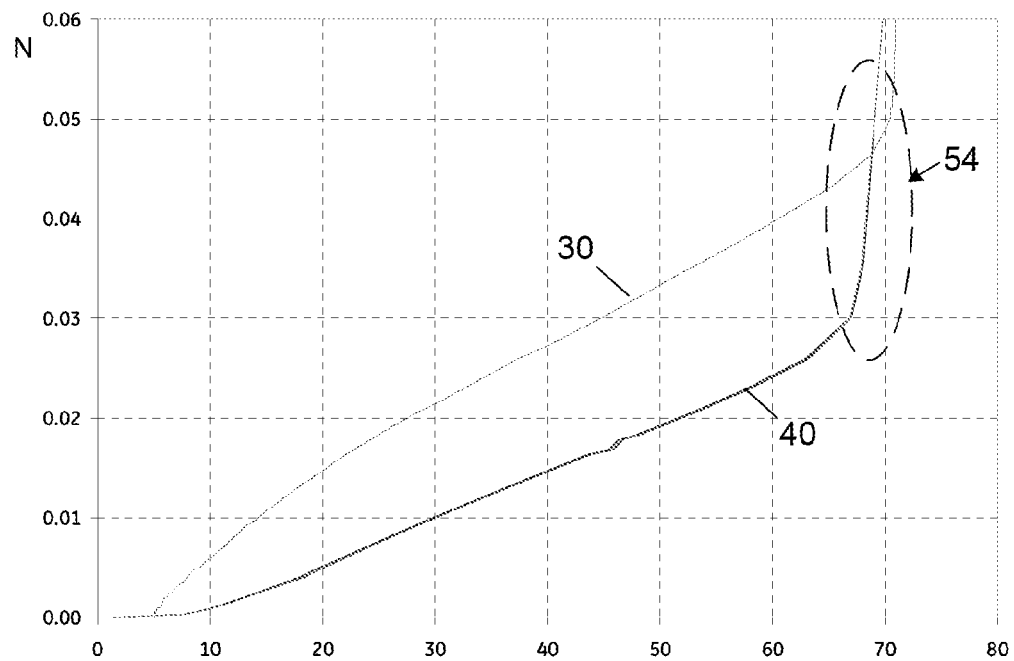
FIG. 10 is a plot of Boundary Layer Profile position normal to the blade surface versus velocity.
Figure 11:
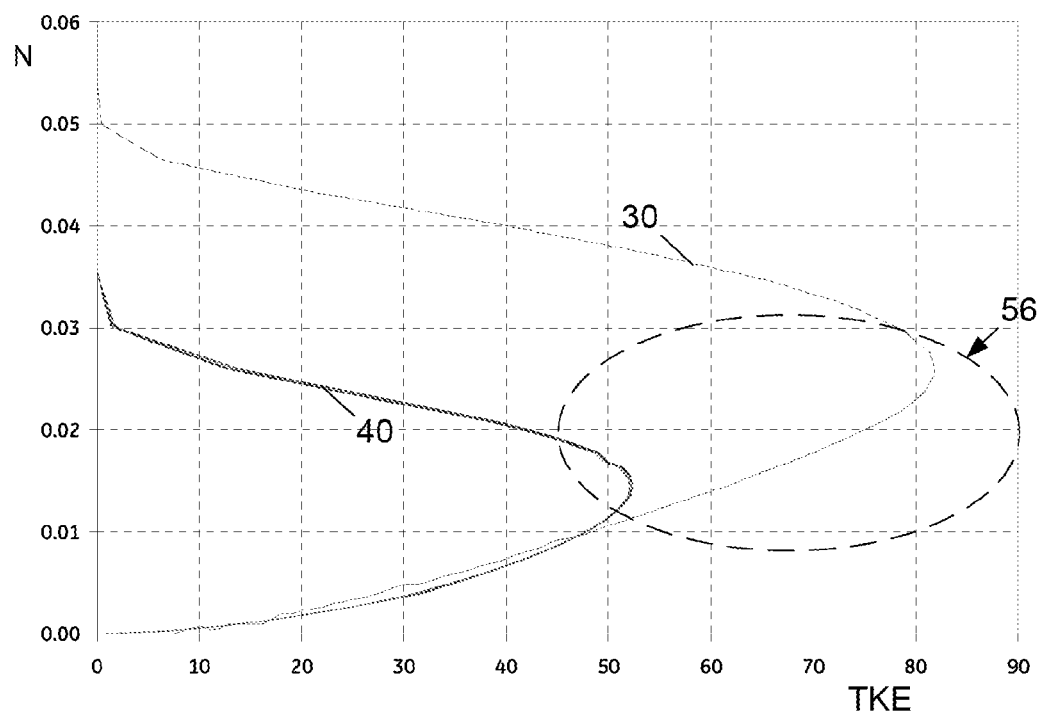
FIG. 11 is a plot of position normal to the blade surface versus turbulence kinetic energy.

FIGS. 9-11 show the results of a comparative flow simulation for a position of the blade discussed above with and without the boundary layer fins shown 22 in FIG. 5 operating at an angle of attack of nine degrees. The leading edge of the boundary layer fins 22 is arranged at 60% of chord from the leading edge of the blade 22, the height "H" is 50% of the local boundary layer thickness, the length "L" is five times the local boundary layer thickness, the radius of curvature "R" of the top surface is 60 millimeters, the distance "d" between two boundary layer fins in a pair is 9.33 millimeters, and the distance "D" between two pairs of boundary layer fins is 16.56 millimeters.

FIG. 9 shows pressure coefficient "$C_p$" versus non-dimensional chord "x/c" where the plot 30 is for the baseline case without boundary layer fins and the plot 40 is for the boundary layer fins 22 described in the previous paragraph. FIG. 9 illustrates the improved pressure recovery provided by the boundary layer fins in the outboard region 50 near the trailing edge of the blade 20 FIG. 9 also illustrates the increased loading in the leading edge region 52 of blade 20.

FIG. 10 shows distance "N" in meters normal to the suction surface of the blade versus local flow velocity "V" in meters per second where the plot 30 is for the baseline case without boundary layer fins and the plot 40 is for the boundary layer fins 22 described above. FIG. 10 illustrates the decreased boundary layer thickness in the region 54 approximately 0.02 to 0.06 meters from the suction surface of the blade 20. FIG. 10 shows distance "N" in meters normal to the suction surface of the blade versus local turbulence kinetic energy "TKE" in meter-squared per second-squared where the plot 30 is for the baseline case without boundary layer fins and the plot 40 is for the boundary layer fins 22 described above. FIG. 11 illustrates the decreased turbulence kinetic energy in the region 56 approximately 0.01 to 0.03 meters from the suction surface of the blade 20. Eddy dissipation levels are similarly reduced.

The technology disclosed here offers various advantages over conventional approaches. For example, the addition of boundary layer fins 22 causes the boundary layer thickness to be reduced and boundary layer separation to be minimized. Adverse pressure gradient is overcome along with reduced turbulence kinetic energy and turbulent eddy dissipation levels. Aerodynamic performance is not significantly changed as entrainment of the free stream flow into the boundary layer region energizes the flow and thus decreased the boundary layer thickness. There is a significant increase in the laminar region which results in increased the lift and decreased drag. There is also a significant reduction in boundary layer thickness and turbulence kinetic energy, which reduces noise due to otherwise weak boundary layer separation.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A wind turbine blade comprising:

a plurality of boundary layer fins, aligned substantially parallel to a direction of flow over the blade, for reducing boundary layer separation from the blade;

each of the boundary layer fins having a height of between approximately 25% to 100% of a local boundary layer thickness at the corresponding boundary layer fin;

a top surface of each of the boundary layer fins having a radius of curvature of between approximately 2 to 15 times a local boundary layer thickness at the corresponding boundary layer fin;

each of the boundary layer fins having a length of between approximately 2 to 40 times a height of the corresponding boundary layer fin; and wherein the boundary layer fins are arranged in a plurality of pairs, each boundary layer fin in a pair is separated by a first distance of between approximately 2 to 8 times a local boundary layer thickness at the corresponding pair of boundary layer fins; and each pair of boundary layer fins is separated by a second distance of between approximately 2 to 8 times a local boundary layer thickness between the corresponding pairs of boundary layer fins.

* * * * *